US012391061B2

(12) United States Patent
Coletta

(10) Patent No.: US 12,391,061 B2
(45) Date of Patent: Aug. 19, 2025

(54) SYSTEM AND METHOD FOR CIRCLE AND CURVE DRAWING TEMPLATE

(71) Applicant: Louis Stephan Coletta, Burlington, WA (US)

(72) Inventor: Louis Stephan Coletta, Burlington, WA (US)

( * ) Notice: Subject to any disclaimer, the term of this patent is extended or adjusted under 35 U.S.C. 154(b) by 466 days.

(21) Appl. No.: 17/882,563

(22) Filed: Aug. 6, 2022

(65) Prior Publication Data

US 2023/0043698 A1 Feb. 9, 2023

Related U.S. Application Data

(60) Provisional application No. 63/230,730, filed on Aug. 7, 2021.

(51) Int. Cl.
*B43L 13/20* (2006.01)

(52) U.S. Cl.
CPC .................................... *B43L 13/20* (2013.01)

(58) Field of Classification Search
CPC ................................ B43L 13/20; B43L 9/007
See application file for complete search history.

(56) References Cited

U.S. PATENT DOCUMENTS 773,299 A * 10/1904 Stokes ...................... B43L 9/00 33/27.06
2,546,885 A * 3/1951 Burckhardt ........... B43L 13/002 33/1 AP
3,815,245 A 6/1974 Streander
4,129,948 A 12/1978 Hatter et al.
4,173,829 A 11/1979 Khait
D281,887 S 12/1985 Lapsins
4,734,992 A 4/1988 Scott
4,736,526 A 4/1988 Hsia
5,822,871 A 10/1998 Walker
6,758,446 B2 7/2004 Bjornrud
8,250,771 B2 * 8/2012 Pinal ..................... B43L 13/002 33/473
8,782,912 B1 * 7/2014 Jensen .................... B43L 9/045 33/484
2023/0043698 A1 * 2/2023 Coletta .................. B43L 13/20

FOREIGN PATENT DOCUMENTS

SU 1181897 A1 * 9/1985

OTHER PUBLICATIONS

"Horizontal Curves: What They Are And How To Deal With Them," esf.edu, https://www.esf.edu/for/germain/Horizontal%20Curve%20Formulae.pdf [Date accessed: May 13, 2021].

* cited by examiner

*Primary Examiner* — Yaritza Guadalupe-McCall
(74) *Attorney, Agent, or Firm* — Bold IP, PLLC; Christopher Mayle

(57) ABSTRACT

A system and method for a template tool to create large curves for material layout, form-making, and construction or other shapes that cannot be handedly formed or accomplished indoors or outside where lack of space or where obstructions exist whereby the template may be used as a simple drafting tool to 'sweep' small curves about the 'O' center point, or with 1- or 2-point methods to produce larger vertical and horizontal circular layouts for arches, circles, and anything that requires a circular shape.

12 Claims, 6 Drawing Sheets

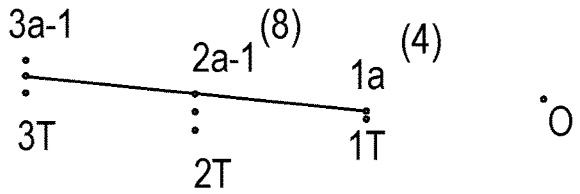
FIG. 7
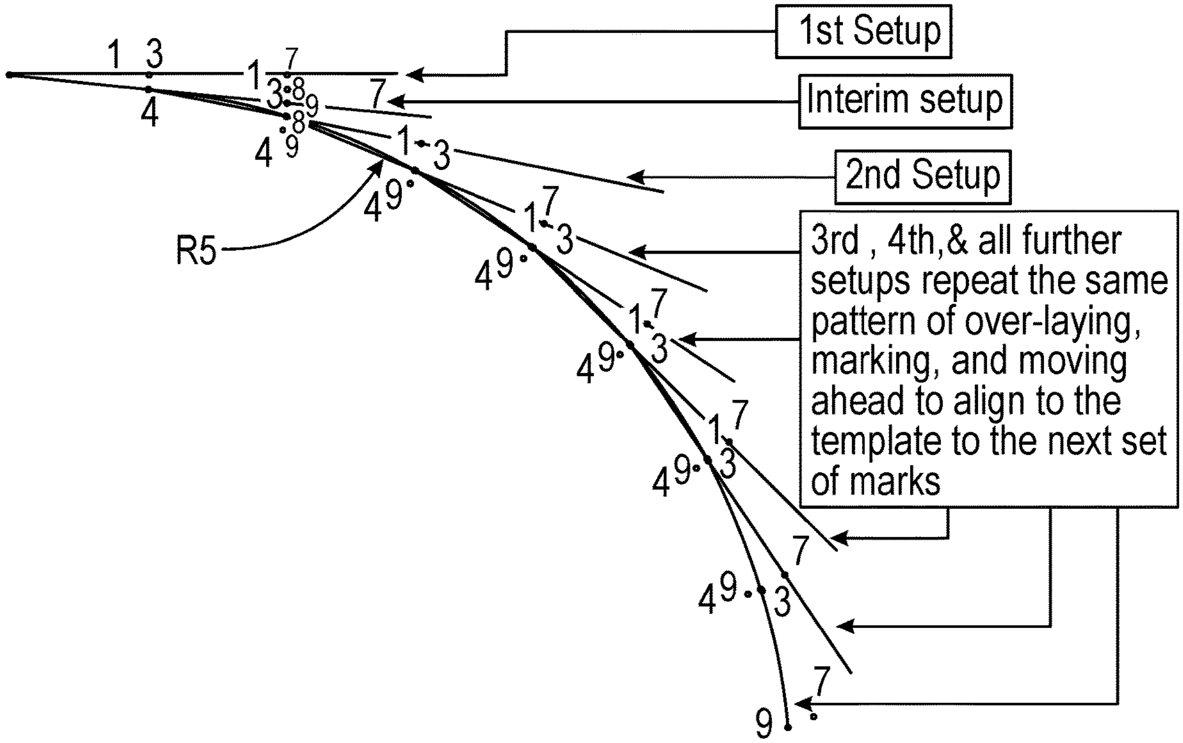
FIG. 8
| One Point Method for CirCLS Templates | | | | | | | |
|---|---|---|---|---|---|---|---|
| | Hole (#) | Origin (1) | 1T (3) | a1 (4) | 2T (7) | Interim (8) | a2 (9) |
| Setup# | | On centerline | On centerline | Selected offset | On centerline | Selected offset | Selected offset |
| Initial/First | Begin Curve | 1 | 3 | Mark | 7 | Void | Mark |
| 2nd | | 1 | 4 | Void | 9 | Mark | Void |
| 3nd | | 4 | 8 | Void | 9 | Void | Mark |
| 4th | | 8 | 9 | Void | 9 | Void | Mark |
| 5th & more | | 9 | 9 | Void | 9 | Void | Mark |
FIG. 9

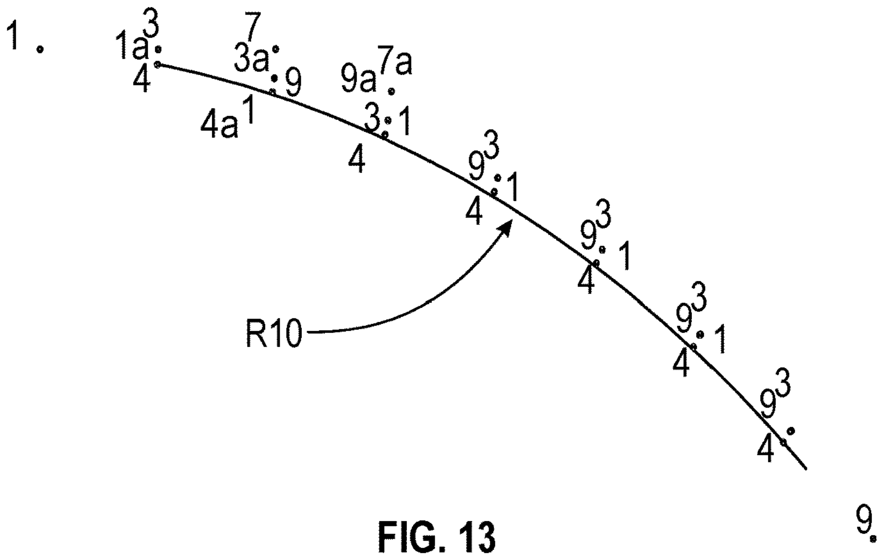
FIG. 13
| Two Point Method For CirCLS Templates | | | | | | | |
|---|---|---|---|---|---|---|---|
| | Hole (#) | Origin (1) | 1T (3) | a1 (4) | 2T (7) | Interim (8) | a2 (9) |
| Setup # | | On Centerline | On Centerline | Selected Offset | On Centerline | Selected Offset | Selected Offset |
| Initial/First | Begin Curve | 1 | 3 | Mark | 7 | Void | Mark |
| 2nd | | 4 | 7 | Mark | 9 | Void | Mark |
| 3rd | | 4 | 7 | Mark | 9 | Void | Mark |
| 4th | | 4 | 7 | Mark | 9 | Void | Mark |
| 5th & More | | 4 | 7 | Mark | 9 | Void | Mark |
FIG. 14
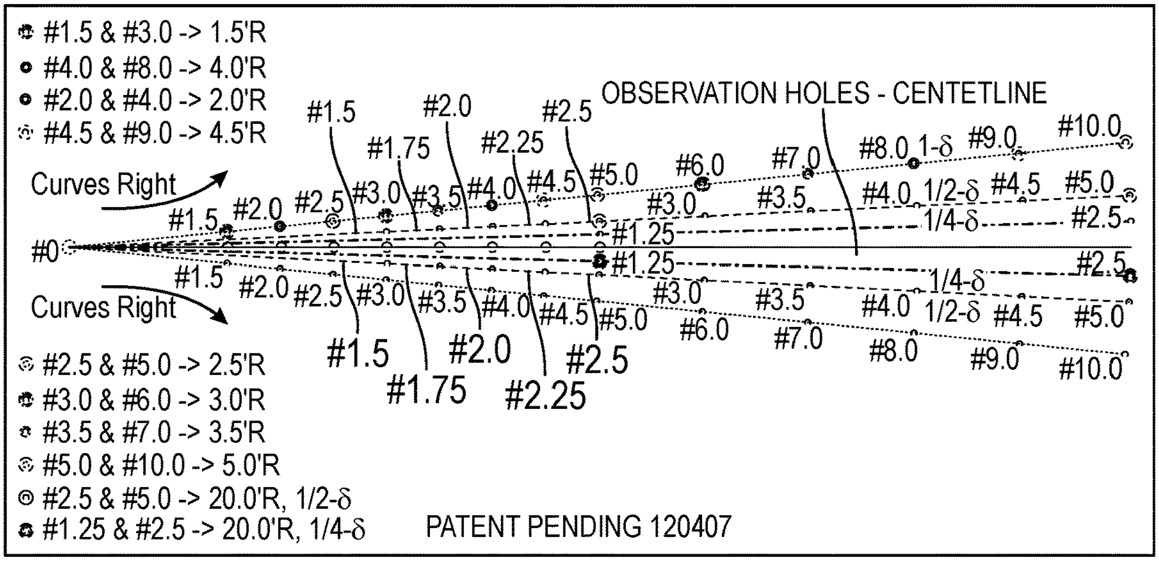
FIG. 15

| CURVE RADII & HOLE POSITIONS | | | | | | | |
|---|---|---|---|---|---|---|---|
| 1 - POINT METHOD | | | 2 - POINT METHOD | | | | |
| RADIUS, δ | Interim @ 2T | | RADIUS, δ | 1T, ft | A1 | 2T, ft | A2 |
| 1 FT | #3 | SAME HOLES AS 2-POINT METHOD | 2 FT | 0.2 | #2 | 0.4 | #4 |
| 1.25 FT | #3.75 | | 2.25 FT | 0.25 | #2.5 | 0.5 | #5 |
| 1.5 FT | #4.5 | | 3 FT | 0.3 | #3 | 0.6 | #6 |
| 1.75 FT | #5.25 | | 3.5 FT | 0.35 | #3.5 | 0.7 | #7 |
| 2 FT | #6 | | 4 FT | 0.4 | #4 | 0.8 | #8 |
| 1.25 FT | #6.75 | | 4.5 FT | 0.45 FT | #4.5 | 0.9 | #9 |
| 2.5 FT | #7.5 | | 5 FT | 0.5 FT | #5 | 1 | #10 |
| RADIUS, 1/2 δ | Interim @ 2T | | RADIUS, 1/2 δ | T1, ft | A1 | T2, ft | A2 |
| 3 FT | #2.25 | SAME HOLES AS 2- POINT METHOD | 6 FT | 0.3 | #1.5 | 0.6 | #3 |
| 3.5 FT | #2.625 | | 7 FT | 0.35 | #1.75 | 0.7 | #3.5 |
| 4 FT | #3 | | 8 FT | 0.4 | #2 | 0.8 | #4 |
| 4.5 FT | #3.375 | | 9 FT | 0.45 | #2.25 | 0.9 | #4.5 |
| 5 FT | #3.75 | | 10 FT | 0.5 | #2.5 | 1 | #5 |
| RADIUS, 1/4 δ | Interim @ 2T | | RADIUS, 1/4 δ | T1, ft | A1 | T2, ft | A2 |
| 5.5 FT | #2.0625 | SAME HOLES AS 2- POINT METHOD | 11 FT | 0.275 | #1.375 | 0.55 | #2.75 |
| 6 FT | #2.25 | | 12 FT | 0.3 | #0.75 | 0.6 | #3 |
| 7 FT | #2.625 | | 14 FT | 0.35 | #0.875 | 0.7 | #3.5 |
| 8 FT | #3 | | 16 FT | 0.4 | #1 | 0.8 | #4 |
| 9 FT | #3.375 | | 18 FT | 0.45 | #1.125 | 0.9 | #4.5 |
| 10 FT | #3.75 | | 20 FT | 0.5 | #1.25 | 1 | #5 |

FIG. 16

SYSTEM AND METHOD FOR CIRCLE AND CURVE DRAWING TEMPLATE

CROSS REFERENCE TO RELATED APPLICATIONS

This application claims priority to U.S. Non Provisional application No. 63/230,730 filed on Aug. 7, 2021.

FIELD OF THE DISCLOSURE

The overall field of this invention relates to a template for drawing curves or circles and more particularly to a template with multiple apertures for forming different sized circles or three dimensional items for layout, forming, and construction.

BACKGROUND

The circle is the strongest 2-dimensional shape; so is the use of semicircular arches in architecture. Semicircles are often also found in the designs of amphitheaters. Large curves for material layout, form-making, and construction cannot be handedly formed or accomplished indoors or outside where lack of space or obstructions exist. Currently existing technology requires a limited extended tape measure or a survey method to provide as consistent angle as shown in FIG. 1 or are very complicated as shown in FIG. 2. Thus exists the need for a curve drawing template to draw large curves without the need for excessive tools.

SUMMARY

The present invention is directed to a curve drawing template to draw large curves without the need for excessive tools. The template can be used as a simple drafting tool to 'sweep' small curves about the 'O' center point, or with 1- or 2-point methods, anyone can produce larger vertical and horizontal circular layouts for arches, circles, and anything that requires a circular shape. When the physical center of a curve or circle is obstructed or too large to "sweep" an arc of a measured radius, our methods can be used, by an individual, to produce many sized curves, curve segments, curves in tight or interior areas, and full circles without 'sweeping' from a physical center.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

FIG. 7 illustrates the method of the creation of a curve using the one point method.

FIG. 8 illustrates the method of the creation of a curve using the one point method.

FIG. 9 illustrates a table showing the method of the creation of a curve using the one point method.

FIG. 13 illustrates a curve using the two point method.

FIG. 14 illustrates a table showing the method of the creation of a curve using the two point method.

FIG. 15 illustrates a one foot template tool.

FIG. 16 illustrates the curves created with the one foot template tool.

DETAILED DESCRIPTION

Figure 1:
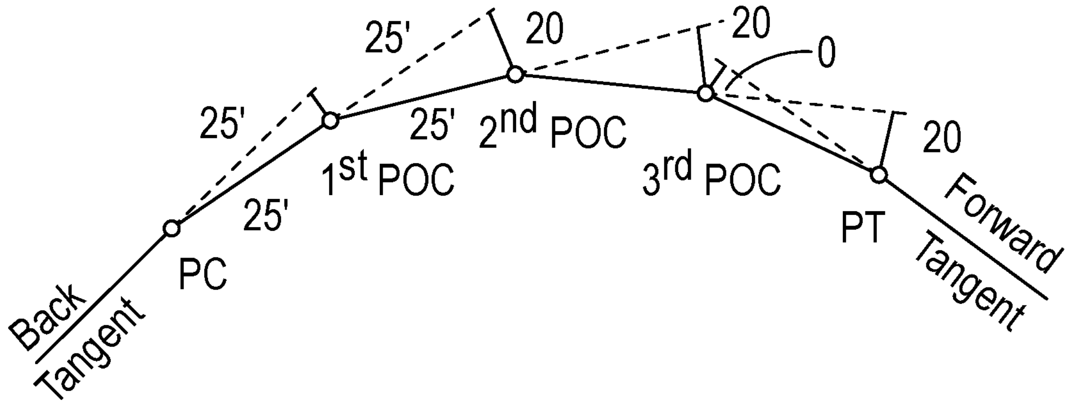
FIG. 1 illustrates a prior art diagram.
Figure 2:
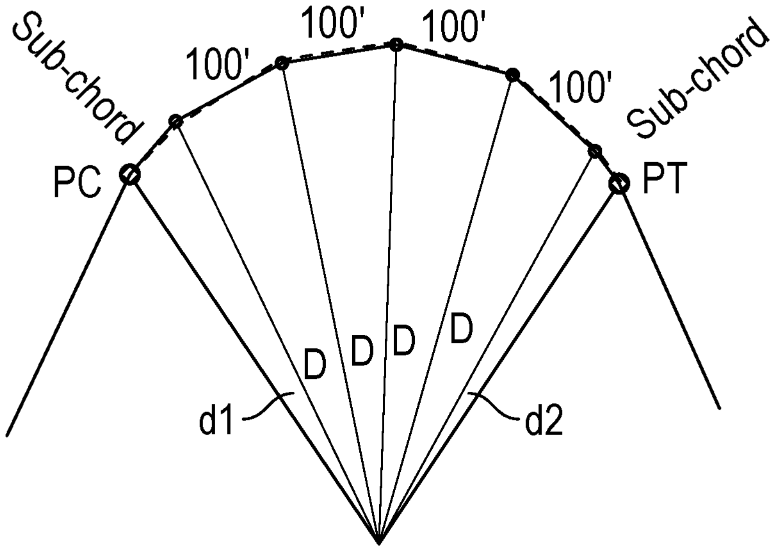
FIG. 2 illustrates another prior art diagram.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, and steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The present disclosure is generally drawn to a system and method, according to one or more exemplary embodiments, for a tool to create large curves for material layout, form-making, and construction or other shapes that cannot be handedly formed or accomplished indoors or outside where lack of space or obstructions exist.

Figure 3:
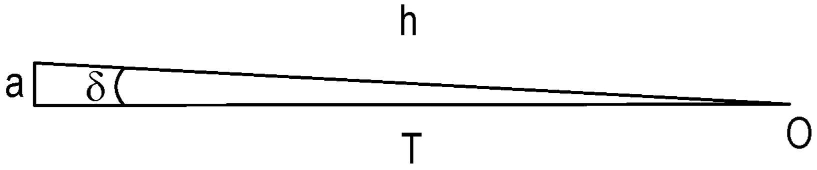
FIG. 3 illustrates a 90 degree right angle triangle to show the offset distance.
Figure 4:
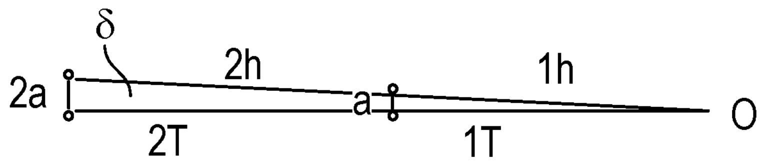
FIG. 4 illustrates a near right angle triangle formed using the template tool.

The principle behind the tool is that any radius, R, represented by a tangent, T1≤0.1R, with an additionally proportionate tangent, T2≤0.2R, and with proportionate offsets, a1≤0.01R & a2≤0.02R, of a circular outline of a curve may be created, which most nearly represents the circular curve of radius R when drawn by a tangent-offset method described in this patent. To create a curve of radius R with this tool, 5 points must be defined; the origin, "O", the 2 points which represent the distances, along a centerline, of T1≤0.1R and T2≤0.2R from the origin, and 2 projected offsets distances of a1≤0.01R, projected from T1, and a2≤0.02R, projected from T2. Both are distances of T1≤0.1R and T2≤0.2R, respectfully from the origin and proportionately, on the curves formed by the curve projection of T1 and T2. "A" is an offset from a tangent projection of some length 'T' from the first point of the curve template 'O.' This may be visualized in FIG. 3 that depicts a near 90° triangle with a very narrow point. This is how the methods of tracing with the template work together. These provide for the foundation of the invention. A near right-angle triangle is formed using the template as shown in FIG. 4. When the template holes, "O," with 2 holes along the center line are selected and marked, tangents 1T and 2T respectfully, and offsets 1*a* & 2*a* are also marked, this creates 5 marks in total "O, 1T, 1*a*, 2T, and 2*a*".

Figure 5:
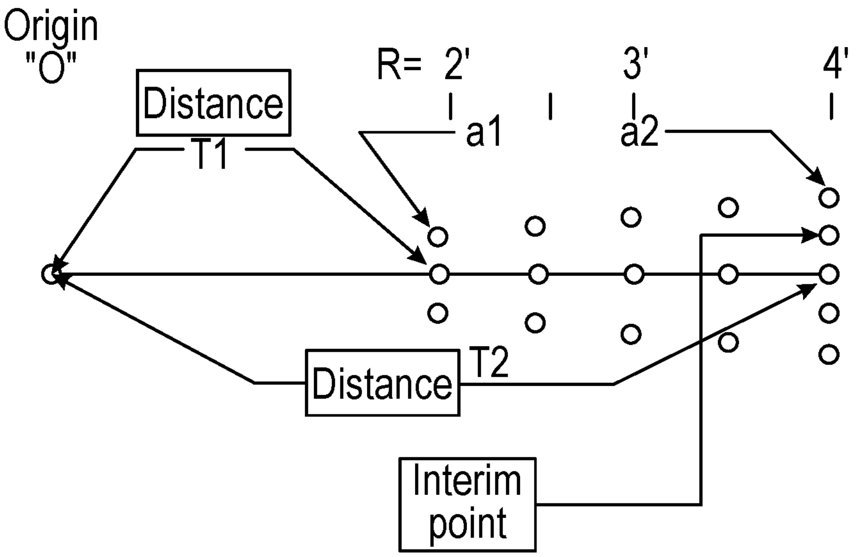
FIG. 5 illustrates methods of drawing a circle.

An illustration of curve template tool is shown in FIG. 15. Curve template tool has a series of holes used to create circles with a 1-foot radius to 10 foot using a 1-point method and a 2 foot radius to 20 foot radius using a 2 point method as illustrated in FIG. 16. The 1-Point Method is a direct method to find a curve with the least number of marks. The 2-Point Method has a "refined" outcome from the 1-Point Method. The 2-Point Method forms a curve that is "twice" the curve radius produced by the 1-Point Method using the same 5 holes as illustrated in FIG. 5. Example: Using 1*a*=#2 and 2*a*=#4@1T=2 and 2T=4, the 2-Point Method produces a 48" diameter circle and the 1-Point Method produces a 24" diameter circle.

Figure 6:
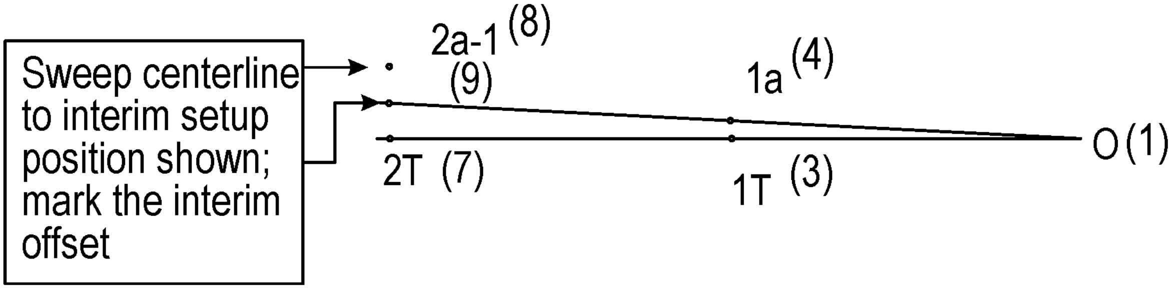
FIG. 6 illustrates the creation of a curve using the one point method.

To begin creating a circle with the 1-Point Method as illustrated in FIG. 6, first 5 points are marked, then the template tool is shifted up, holding the template "O" hole over the "O" mark, the template "1T" hole is aligned over the "1*a*" mark. "2*a*-1(8)" is then marked. (8) is an interim hole halfway between (7) & (9). The template is then slid forward where "O" template hole is placed over the "1*a*-(( ))" mark. The template "1T" hole is then aligned over the "2*a*-1(8)" mark, and "3*a*-1(9)" is marked. The realignment of holding "O" at the next "#a-1(9)" is then repeated whereby template hole "1T" is aligned at the next #a-1(9) and the successive #a-1(9) is marked. This method may be continued until the desired circle or length of curve is achieved.

Figure 10:
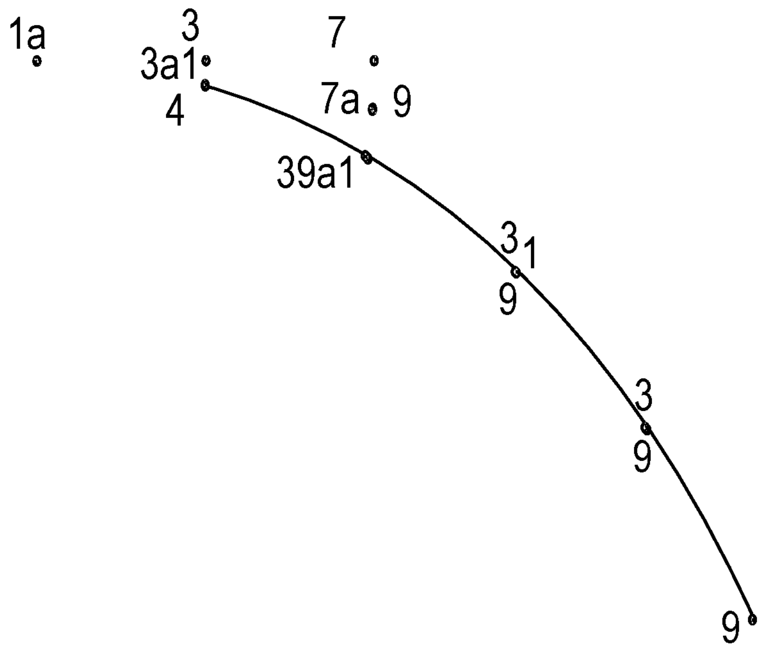
FIG. 10 illustrates a curve using the one point method.

For example, in the creation of a 1-foot radius circle using the 1-point method as illustrated in FIG. 6 using curving template tool of FIG. 15, whereby the Origin, "O" is 1, the set of holes, "a1" (upper) is 2; "T1" (center) is 3, "a1" (lower) is 4; "a2" (upper) is 5, "T2" (center) is 7, and "a2" (lower) is 9. The method begins by marking tangent distances "1T and 2T" and offsets "a1 and a2" from the origin or points 1, 3, 4, 7, and 9. The next step is a key difference. Hold the template "O" over the mark for "O" (1) and "sweep" the template to align '1T' (3) over 'a1' (4) mark. Mark "2*a*-1" (8), as shown in FIG. 7. Secondly, move the template ahead to place the template "O" hole over the "1*a*" (4) mark. Align the template so that the "1T" (3) hole rests over the interim "2*a*-1" (8) mark. Mark "3*a*-1" (next 9), as shown below. Move ahead and realign the template holding "O" (1) at the next "#a-1" (3), aligning template hole "1T" at the next "#a-1" (9) & marking #a-1(9). Continue this method of marking until the desired circle or length of curve is achieved as shown in FIGS. 8, 9, and 10.

Figure 11:
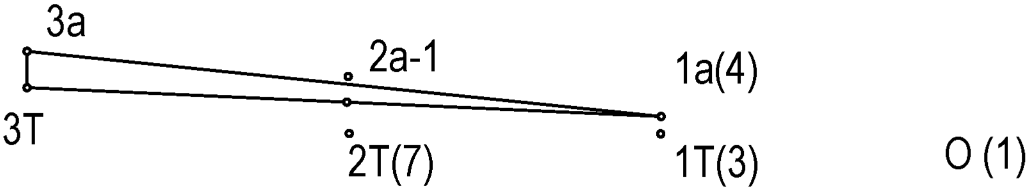
FIG. 11 illustrates the creation of a curve using the two point method.
Figure 12:
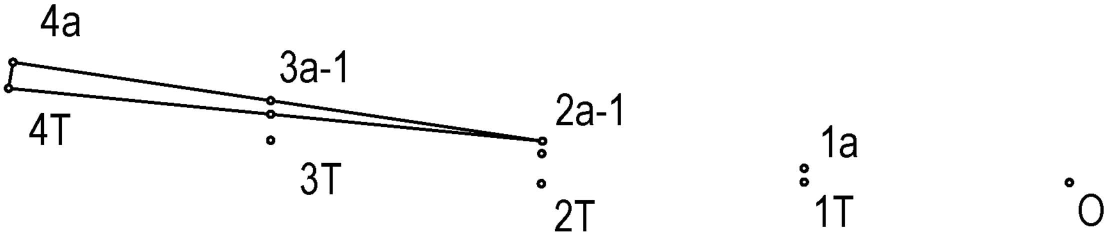
FIG. 12 illustrates the method of the creation of a curve using the two point method.

To begin creating a circle with the 2-Point Method as illustrated in FIG. 11, first 5 points are marked, then move the template, as shown in FIG. 11, to center the "O" (1) hole over the mark "1*a*" (4) and align template "1T" (3) hole over the mark "2*a*" (9). Mark a new "2*a*-1" (4) & "3*a*" (9). Then move the template ahead to place the "O" hole over the "2*a*-1" mark, as shown in FIG. 12, & align the template "1T" hole over "3*a*" mark. Mark "3*a*-1," & "4*a*". Repeat the realignment of "O" at "#a-1", aligning template hole "1T" at the next "(#+1} a", & marking the next "(#+1)a-1" & "(#+2)a". Continue this method of marking until the desired circle or length of curve is achieved as shown in FIGS. 13 and 14. Make your curve alignment from the "#a-1" (4) marks; use the "#T" (9) marks for off-set work as shown in FIG. 13.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A method for creating one or more curves or circles using a template tool, the method comprising:

defining an origin point (O) on the template tool at a template origin hole, the template tool having a series of holes for marking that are separated by a predetermined distance;

marking a first tangent point (1T) at a first distance from the origin point, wherein the first distance is less than or equal to 0.1R, where R is a desired radius of a curve;

marking a second tangent point (2T) at a second distance from the origin point, wherein the second distance is less than or equal to 0.2R;

marking a first offset point (a1) at a first offset distance from the first tangent point, wherein the first offset distance is less than or equal to 0.01R;

marking a second offset point (a2) at a second offset distance from the second tangent point, wherein the second offset distance is less than or equal to 0.02R; and drawing a curve segment by connecting the marked points.

2. The method of claim 1 further comprising:

aligning the template tool with the origin point; aligning a first template hole with the first offset point;

marking an interim point between the first offset point and the second offset point; and progressively marking additional points to complete the curve.

3. The method of claim 2 further comprising:

placing the template origin hole over the first offset point;

aligning the first template hole with the interim point;

marking a next curve point; and repeating the alignment; and marking steps until a desired curve length is achieved.

4. A template tool for creating one or more curves or circles, the template tool comprising;

a body;

a plurality of holes formed in the body, wherein the plurality of holes comprise: an origin hole; at least one first tangent hole positioned at a first predetermined distance from the origin hole; at least one second tangent hole positioned at a second predetermined distance from the origin hole; at least one first offset hole positioned at a first offset predetermined distance from the at least one first tangent hole; and at least one second offset hole positioned at a second offset predetermined distance from the at least one second tangent hole.

5. The template tool of claim 4, wherein the first predetermined distance is proportional to a desired radius of a curve to be drawn; the second predetermined distance is proportional to the desired radius; the first offset predetermined distance is proportional to the desired radius; and the second offset predetermined distance is proportional to the desired radius.

6. The template tool of claim 5 further comprising:

wherein the plurality of holes are configured to enable drawing of the one or more curves or circles having the desired radius be in a range from one foot to ten feet using a one-point method.

7. The template tool of claim 5, wherein the plurality of holes are configured to enable drawing of the one or more curves or circles having the desired radius be in a range from two feet to twenty feet using a two-point method.

8. A method for drawing curves using a template tool using a series of sweeps, comprising in order:

creating five reference points on the template tool comprising an origin point, two tangent points, and two offset points, wherein the template tool has a plurality of holes for marking; positioning the template tool with an origin hole over the origin point;

aligning a first tangent hole with a first offset point of the two offset point;

marking an interim point;

repositioning the template tool with the origin hole over the first offset point;

aligning the first tangent hole with the interim point;

marking a next curve point; and repositioning, aligning, and marking to create another curve point to form a continuous curve.

9. The method of claim 8, further comprising: positioning the two tangent points at distances T1 and T2 from the origin point; and positioning the two offset points at distances a1 and a2 from their respective tangent points.

10. The method of claim 8, further comprising: selecting a set of holes in the template tool based on a desired curve radius; wherein the set of holes comprises the origin hole, the first tangent hole, and corresponding offset holes.

11. The method of claim 8, wherein the method enables drawing of the curves in spaces where physical access to a curve center point is obstructed.

12. The method of claim 8, wherein the method enables drawing of the curves without requiring a physical sweep of an arc of a measured radius.

* * * * *